May 16, 1939.	C. I. HALL ET AL	2,158,857
TEMPERATURE CONTROL DEVICE
Filed Nov. 30, 1937
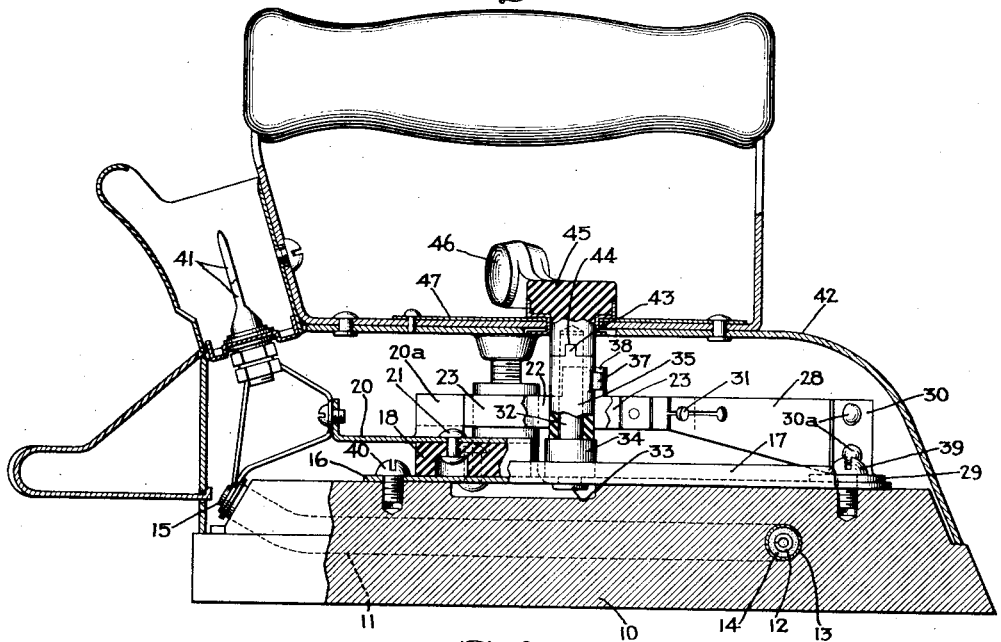
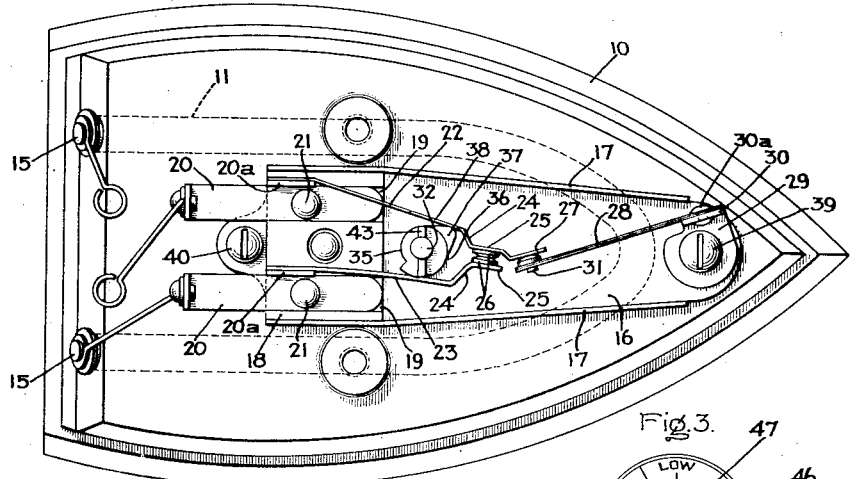
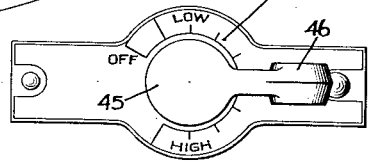
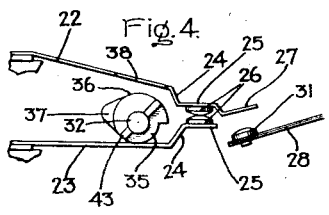
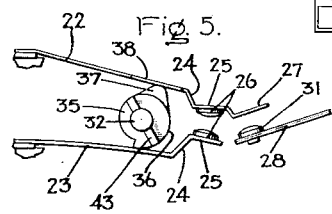
Inventors:
Chester I. Hall,
Claude M. Hathaway,
by Harry E. Dunham
Their Attorney.

Patented May 16, 1939

2,158,857

UNITED STATES PATENT OFFICE 2,158,857

TEMPERATURE CONTROL DEVICE

Chester I. Hall, Schenectady, and Claude M. Hathaway, Niskayuna, N. Y., assignors to General Electric Company, a corporation of New York Application November 30, 1937, Serial No. 177,264

6 Claims. (Cl. 200—138)

This invention relates to temperature control devices, more particularly to temperature control devices for controlling an electric circuit, such as a heating circuit, in response to changes in temperature, and it has for its object the provision of a simple, reliable and efficient device of this character, and further, one which is quite inexpensive to make.

While not limited thereto, this invention has particular application in controlling the energizing circuit of an electrically heated flatiron to maintain a selected temperature in the iron.

In accordance with this invention in one form thereof, the temperature responsive control device comprises a pair of resilient switch arms carrying cooperating contacts. A temperature responsive device, such as a bimetallic thermostatic bar, cooperates with one of the switch arms to open and close these contacts in response to changes in temperature. The bimetallic bar is so related to the switch arm which it operates as to have a frictional sliding engagement with it. Inasmuch as the static friction is greater than the sliding friction between the members, the thermostatic bar must build up a force before it can overcome the frictional resistance to movement with relation to the switch arm. But once it has overcome this initial or static resistance, it quickly moves the switch arm, because the frictional resistance is decreased by the movement. In other words, the switch arm is moved with a slight snap action.

In addition, a suitable cam device is provided which coacts with the switch arms to vary their positions with relation to the thermostatic member and thereby vary the temperature setting of the control device. The cam means is further arranged to positively and forcibly separate the switch arms to open the switch contacts.

For a more complete understanding of this invention, reference should be had to the accompanying drawing in which Fig. 1 is an elevation mainly in section of an electrically heated flatiron provided with a temperature control device arranged in accordance with this invention; Fig. 2 is a plan view of the flatiron of Fig. 1 with the cover removed so as to illustrate certain details of construction; Fig. 3 is a plan view showing a temperature adjusting member used with the temperature control device of Figs. 1 and 2; and Figs. 4 and 5 are fragmentary views in plan illustrating certain elements of the temperature control device of this invention in different operative conditions.

Referring to the drawing, this invention has been shown in one form as applied to an electrically heated flatiron having a sole plate 10 formed of any suitable metal, such as cast iron or aluminum. Cast within the sole plate 10 is an electrical heating element 11, preferably of the sheathed type, such as described and claimed in the United States patent to C. C. Abbott No. 1,367,341, dated February 1, 1921. Briefly, this element comprises a helical resistance conductor 12 mounted within a metallic sheath 13 and supported in spaced relation with reference to the sheath by a mass of electrically insulating heat conducting material 14, such as powdered magnesium oxide. Heating units of this character can be bent easily into various shapes, and as shown, the heating element 11 is bent roughly in the shape of an elongated U, the bend being in the forward part of the iron at the tip, whereas the two ends are located at the heel of the iron. These two ends support the heater terminals 15.

The temperature control device arranged in accordance with this invention comprises a metallic supporting base plate 16 which is shown as substantially flat, and which at its side edges is provided with upright flanges 17. Mounted on the base plate 16 at one end thereof between the flanges 17 is an insulating supporting block 18 formed of any suitable material, such as a suitable ceramic. In the upper surface of this insulating block 18 are a pair of spaced parallel recesses 19 arranged longitudinally of the member, as shown in Fig. 2. Mounted within the recesses 19 are a pair of flat terminal members 20 which are secured to the insulating block by rivets 21. Each of the terminal members 20 is provided with an upright ear 20a, these ears preferably being positioned on corresponding sides of the terminal members, the upper sides, as viewed in Fig. 2.

Mounted upon the ears 20a are a pair of resilient switch arms 22 and 23 respectively arranged substantially perpendicular to the base 16. The switch arms 22 and 23, as shown, have corresponding ends rigidly secured to the ears 20a. This may be accomplished in any suitable manner as by welding. The arms project outwardly from the ears toward the opposite end of the plate 16, and the ends of these arms opposite to those secured to the lugs are free to move. The free ends of the arms have inwardly extending portions 24 directed toward each other and the portions 24 merge into outwardly extending portions 25 arranged in substantially parallel relation with each other. These portions 25 carry switch contacts 26 which normally are biased into engagement, as shown in Fig. 2, by the inherent resiliency of the switch arms.

One of the arms 22 carries on its end an angular extension 27, which as shown is arranged generally at an angle to the main portion of the arm 22 lying between the ear 20a, and the inturned portion 24. As shown, the upper arm 22, as viewed in Fig. 2, is provided with this extension.

Rigidly mounted on the end of the plate 16 opposite to the insulator 18 is a bimetallic thermostatic bar 28. This bar is formed of two metals having dissimilar temperature coefficients of expansion, such as brass and Invar, welded together lengthwise and the strip 28 is supported edgewise to the base as are the arms 22 and 23. The extreme right-hand end of the bar, as viewed in Figs. 1 and 2, is rigidly secured to a supporting bracket 29, which as shown, is provided with an upright ear 30 to which the bar is rigidly secured by means of rivets 30a. The support 29 is rigidly secured to the base 16 in any suitable manner, as by welding. The thermostatic bar, as shown extends from the support 29 toward the switch arms 22 and 23, and on its free end carries a button 31 formed of any suitable electrically insulating material, such as porcelain. It will be observed that the thermostatic bar 28 is supported with relation to the switch arms 22 and 23 so that it lies substantially parallel with the angular extension 27 on the switch arm 22. It will be observed that the thermostatic bar is so arranged that it will tend to move the abutment 31 upwardly, as viewed in Fig. 2, as its temperature rises. And conversely when its temperature is reduced it tends to move the button 31 downwardly. When the button moves upwardly it engages the angular extension 27 and eventually will operate to open the contacts 26 in response to a predetermined high temperature in the bar 28, and when this temperature falls to a predetermined minimum it will permit the contacts to reclose.

Also mounted on the base is an upright stud or bearing member 32, which as shown, is located between the switch arms 22 and 23 and which is rigidly secured to the base plate by means of a rivet 33. The bearing member 32 has an enlarged base 34. Rotatably mounted on the bearing member 32 and resting on the enlarged section 34 is a cam 35 which is formed of any suitable electrically insulating material, such as porcelain. The cam 35 has a substantially spirally arranged cam surface 36 which is adapted to engage the switch arm 23 to vary its position, and hence, that of the arm 22 with relation to the thermostatic member 28. It will be understood that the two arms 22 and 23 are biased toward each other by their inherent resiliency, and hence, when the arm 23 is moved by the cam either upwardly or downwardly, as viewed in Fig. 2, the switch arm 22 will move with it. When the cam is in its position shown in Fig. 2, the angular extension 27 will be engaged by the abutment 31 on the thermostatic member and this constitutes the low temperature setting of the control device. Thus in this position of the cam, the thermostatic member 28 has to move but a very slight distance upwardly to effect the opening of the switch contacts. If the cam member be moved in a clockwise direction from this position to the position of Fig. 4, it will permit the two arms to move upwardly to thereby increase the temperature setting of the control device. In Fig. 4 the cam is shown in its highest temperature setting position. It is to be noted here that the two arms 22 and 23 have substantially the same strength, and as they are similar in shape they seek, when unrestrained, a center or neutral position which is substantially midway between them. Hence, the arms are permitted to move upwardly as the cam is adjusted from its position of Fig. 2 to its position of Fig. 4.

The cam member 35 is further provided with a projection 37 which is arranged to cooperate with an upstanding ear or lug 38 on the switch arm 22 to forcibly move the switch arm 22 to separate the contacts 26. If when the cam 35 is in its lowest temperature setting position, as shown in Fig. 2, it be moved in the counter clockwise direction, the projection 37 will be moved into engagement with the lug 38 to forcibly move the switch arm 22 upwardly to separate the contacts 26, as shown in Fig. 5.

An important feature of this invention is the arrangement of the switch arms 22 and 23 and their relation to the thermostatic member 28 so that a relatively large sliding movement is effected between the angular extension 27 and the button 31 as the thermostat bar and switch arm are moving. This large movement is effected by supporting the switch arm 22 and bimetal bar at their opposite ends thereby causing their two ends to move on diverging arcs; this effect is accentuated by positioning the switch arm and thermostat bar at a relatively wide diverging angle, as shown, with the bar substantially parallel to the extension 27. The resiliency of the arm 22 is such that there is a considerable frictional force set up between the button and the angular extension. The static frictional force is greater than the sliding frictional force, and hence, the bimetallic bar 28 must build up a pressure on the extension 27 before it can overcome this static friction. Once, however, it has stored sufficient energy to overcome this static frictional resistance and the switch arm starts to move, the arm will be operated at increasing speed because of the decreased sliding frictional resistance. In other words, there is, in effect, a slight snap action in opening the switch contacts. In the same way the switch arm closes the contact with a slight snap action. In view of the fact that the free end of the bimetallic bar frictionally engages the free end of the switch arm 22 in this manner, all "reed" action of the bimetal bar and of the switch contacts, and chattering of contacts due to "reed" action are eliminated.

In mounting the temperature control device in a flatiron, it is preferable that the support 16 be placed on the sole plate 10 with the thermostatic element 28 at the right hand end or toe end of the iron, as viewed in Figs. 1 and 2 so as to be located in a relatively high temperature area of the iron. The plate is in direct thermal control with the sole plate, and therefore the thermostat 28 also is substantially in direct thermal relation with the sole plate. Thermostatic device as a whole is secured to the iron by means of screws 39 and 40 directed through apertures provided for it in the opposite ends of the plate 16 and received in threaded engagement in the sole plate. The forward screw 39 preferably will be directed through an aperture also provided for it in the support 29. When in position one of the terminals 20 is connected with one terminal 15 of the heater 11, as shown, and the other is connected with one of the terminal pins 41 of the iron, the opposite terminal pin 41 being connected with the other terminal 15 of the heating element.

The cam member 35 extends upwardly toward the cover 42 of the iron and at its upper end is provided with a transverse tooth 43 which is received in a transverse slot 44 provided for it in an operating member 45 which is directed downward through an aperture provided for it in the cover 42 for engagement with the tooth 43. The operating member is provided with a knob 46 whereby it may be conveniently operated. This knob further serves as an indicator cooperating with a temperature scale 47 mounted on the cover.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What we claim as new and desire to secure by Letters Patent of the United States, is:

1. A temperature control device comprising an elongated switch arm and an elongated bimetallic thermostat bar having movable ends adjacent each other, and said members diverging away from said adjacent ends at a relatively wide angle to each other, and one of said members having an angular extension of substantial length lying in a plane substantially parallel to the other member and engageable by the other as the temperature of said bar is changed, the point of engagement between said extension and said other member moving a considerable distance along the angular extension when the thermostat bar moves responsively to temperature changes.

2. A temperature control device comprising a pair of switch arms having corresponding ends fixed and their other correspondings ends free to move and carrying cooperating switch contacts, means biasing said contacts together, a temperature responsive element operably associated with one of said arms to move it to open and close said contacts responsively to temperature changes, and cam means engaging one of said arms to vary the position of said two free ends with relation to said temperature responsive means and thereby vary the temperature setting of said control device, and further, to forcibly separate said arms to open said contacts against the force of said biasing means.

3. A temperature control device comprising a pair of resilient switch arms having corresponding ends fixed and their other corresponding ends free to move and carrying cooperating switch contacts that are biased together by the resiliency of said arms, a temperature responsive element operably associated with one of said arms to move it to open and close said contacts responsively to temperature changes, a cam between said arms rotatable on a fixed axis and having a cam surface arranged to engage the other of said arms to vary the positions of said arms, and a projection on said cam for engaging said one arm when said cam is moved to a predetermined position to separate said arms to open said contacts.

4. A temperature control device comprising a metallic support, an insulating block on said support, a pair of terminals on said support, a pair of resilient switch arms secured to said support by said terminals and carrying contacts biased together by the resiliency of said arms, a thermostatic element mounted on said support carrying an insulating button engaging one of said arms to open and close said contacts responsively to temperature changes, and a cam mounted on said support cooperating with said arms to vary their position with relation to said thermostatic element so as to vary the temperature setting of said control device, when the cam is moved through a certain range of movement, and when moved to another position to forcibly move said arms to open said contacts.

5. A temperature control device comprising a metallic support, a pair of resilient switch arms on said support, means for insulating said arms from said support, said arms having corresponding ends fixed and their other ends free to move, said latter ends carrying cooperating fixed contacts, a thermostatic member on said support cooperating with one of said arms to operate it to open and close said contacts responsively to temperature changes, a stud mounted on said support between said switch arms, an electrically insulating cam rotatably mounted on said stud and cooperating with said arms to vary their positions with relation to said thermostatic member when moved through a certain range of movement and also to separate said arms to open the contacts when moved to a predetermined position, and means for operating said cam through said range of movement and also to said position.

6. A temperature control device for electrically heated flatirons comprising an elongated metallic member adapted to be positioned in direct thermal relation with said iron, an electrically insulating block supported on one end of said member having spaced recesses in its upper surface, terminals in said recesses having upright ears, resilient switch arms having corresponding ends secured to said ears and their other ends free to move and directed toward the opposite end of said member, and said free ends carrying cooperating switch contacts, a bimetallic thermostatic bar having one end fixedly secured to said opposite end of said member and directed toward said free ends of said switch arms and carrying an insulator coacting with one of them to move it to open and close said contacts, a stud mounted on said member between said switch arms, an electrically insulating cam rotatably mounted on said stud and cooperating with said arms to vary their positions with relation to said thermostatic member, a projection on said cam arranged to engage one of said switch arms to forcibly separate them to open said contacts, and means for rotating said cam.

CHESTER I. HALL.
CLAUDE M. HATHAWAY.